US007219924B2

(12) United States Patent
Mulhern et al.

(10) Patent No.: US 7,219,924 B2
(45) Date of Patent: *May 22, 2007

(54) REAR WHEEL DRIVE POWER WHEELCHAIR WITH GROUND-CONTACTING ANTI-TIP WHEELS

(75) Inventors: James P. Mulhern, Hunlock Creek, PA (US); Charles J. Martis, Wyoming, PA (US); Gerald J. White, Jr., Hunlock Creek, PA (US); Kip D. Alder, West Pittston, PA (US)

(73) Assignee: Pride Mobility Products Corporation, West Pittston, PA (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/613,669

(22) Filed: Jul. 2, 2003

(65) Prior Publication Data
US 2004/0004342 A1   Jan. 8, 2004

Related U.S. Application Data

(63) Continuation-in-part of application No. 10/136,763, filed on Apr. 30, 2002, now Pat. No. 6,938,923.

(51) Int. Cl.
*B60K 1/00* (2006.01)
(52) U.S. Cl. ............... 280/755; 280/250.1; 280/304.1; 180/907; 180/65.5; 297/DIG. 4; 297/DIG. 10
(58) Field of Classification Search ............... 280/755, 280/124.16, 124.128, 124.179, 250.1, 304.1; 180/907, 65.1, 65.5; 297/DIG. 4, DIG. 10
See application file for complete search history.

(56) References Cited

U.S. PATENT DOCUMENTS

| 3,848,883 A | 11/1974 | Breacain ..................... 280/5.32 |
| RE28,259 E | 12/1974 | Henschen .................. 267/57.1 |
| 4,898,256 A | 2/1990 | Lehner ........................ 180/8.2 |
| 5,137,295 A | 8/1992 | Peek ....................... 280/304.1 |
| 5,145,020 A | 9/1992 | Quintile et al. ............ 180/65.1 |
| 5,435,404 A * | 7/1995 | Garin, III .................... 180/6.5 |
| 5,531,284 A | 7/1996 | Okamoto ................... 180/65.1 |
| 5,540,297 A | 7/1996 | Meier ........................ 180/65.5 |
| 5,564,512 A * | 10/1996 | Scheulderman ............ 180/65.5 |
| 5,575,348 A | 11/1996 | Goertzen et al. .......... 180/65.6 |

(Continued)

FOREIGN PATENT DOCUMENTS

FR        2399822        3/1979

(Continued)

*Primary Examiner*—Christopher P. Ellis
*Assistant Examiner*—Vaughn Coolman
(74) *Attorney, Agent, or Firm*—DLA Piper US LLP

(57) ABSTRACT

A curb-climbing rear wheel drive power wheelchair is disclosed having a pair of drive wheels, at least one ground-engaging idler wheel connected to the frame forward of the drive wheels and at least one ground-contacting anti-tip caster wheel mounted to the wheelchair aft of the drive wheels. The drive wheels and anti-tip caster wheels are mounted on common suspension arms, pivoted to the frame of the wheelchair behind the drive wheels and resiliently suspended, so that the anti-tip caster wheels move up and down in response to movements of the drive wheel suspension.

24 Claims, 7 Drawing Sheets

U.S. PATENT DOCUMENTS

| | | | |
|---|---|---|---|
| 5,772,237 A * | 6/1998 | Finch et al. | 180/65.1 |
| 5,848,658 A * | 12/1998 | Pulver | 180/65.1 |
| 5,899,475 A | 5/1999 | Verhaeg et al. | 280/250.1 |
| 5,904,214 A | 5/1999 | Lin | 180/15 |
| 5,944,131 A | 8/1999 | Schaffner et al. | 180/65.1 |
| 5,957,474 A | 9/1999 | Mundy et al. | 280/304.1 |
| 5,964,473 A | 10/1999 | Degonda et al. | 280/250.1 |
| 6,070,898 A | 6/2000 | Dickie et al. | 280/304.1 |
| 6,129,165 A | 10/2000 | Schaffner et al. | 180/65.1 |
| 6,131,679 A | 10/2000 | Pulver et al. | |
| 6,135,222 A * | 10/2000 | Furukawa | 180/65.5 |
| 6,176,335 B1 | 1/2001 | Schaffner et al. | 180/65.1 |
| 6,196,343 B1 | 3/2001 | Strautnieks | 180/22 |
| 6,199,647 B1 * | 3/2001 | Schaffner et al. | 180/65.1 |
| 6,217,114 B1 | 4/2001 | Degonda | 297/325 |
| 6,234,507 B1 * | 5/2001 | Dickie et al. | 280/304.1 |
| 6,341,657 B1 * | 1/2002 | Hopely et al. | 180/6.5 |
| 6,357,793 B1 * | 3/2002 | Dickie et al. | 280/755 |
| 6,460,641 B1 * | 10/2002 | Kral | 180/24.02 |
| 6,494,474 B1 | 12/2002 | Kramer, Jr. | |
| 6,530,598 B1 | 3/2003 | Kirby | |
| 6,533,306 B2 * | 3/2003 | Watkins | 280/304.1 |
| 6,554,086 B1 * | 4/2003 | Goertzen et al. | 180/65.1 |
| 2004/0035627 A1 | 2/2004 | Richey, II et al. | |
| 2004/0040769 A1 | 3/2004 | Richey, II et al. | |

FOREIGN PATENT DOCUMENTS

| | | |
|---|---|---|
| JP | 57-186589 | 11/1982 |
| WO | WO 03/103366 | 12/2003 |

* cited by examiner

REAR WHEEL DRIVE POWER WHEELCHAIR WITH GROUND-CONTACTING ANTI-TIP WHEELS

RELATED APPLICATION

The present invention is a continuation-in-part of application Ser. No. 10/136,763, entitled "Power Wheelchair", filed Apr. 30, 2002 now U.S. Pat. No. 6,938,923, the disclosure of which is incorporated herein by reference in its entirety.

FIELD OF THE INVENTION

This invention relates to wheelchairs and, more particularly, to a rear wheel drive power wheelchair with ground-contacting rear anti-tip wheels.

BACKGROUND OF THE INVENTION

Wheelchairs for use by handicapped and disabled persons have been well known for many years. One traditional wheelchair has a seat with a back, and two large wheels positioned on either side of the seat, which a user of the wheelchair can rotate manually in order to propel the wheelchair. The axes of the large wheels are typically behind the center of gravity of the wheelchair and occupant. Two relatively small caster wheels are provided at the front to support and balance the wheelchair. Such wheelchairs occasionally have small anti-tip wheels on rigid mountings to the rear, to catch the wheelchair if it should start to tip backwards. Such a wheelchair is shown in U.S. Pat. No. 3,848,883 to Breacain.

Motorized wheelchairs of similar general configuration are known. An example of such a wheelchair is shown in U.S. Pat. No. 5,540,297 to Meier. This wheelchair has the large powered wheels mounted on sprung trailing arms, and has the rear anti-tip wheels mounted on the ends of the trailing arms.

Power wheelchairs are also known in which the drive wheels are positioned forward of the center of gravity, and the wheelchair normally rests on the drive wheels and on rear caster wheels. These include wheelchairs, known as "mid-wheel drive power wheelchairs," in which the drive wheels are aligned close to the position of the center of gravity and in which anti-tip wheels are provided at the front, to support the wheelchair if it should tip forwards and to assist it in climbing curbs and ramps. Commonly-assigned U.S. Pat. No. 6,129,165 shows a mid-wheel drive power wheelchair in which the front anti-tip wheels are inter-linked to the drive wheel suspension.

A need exists for an improved front-wheel drive wheelchair which includes rear anti-tip wheels that are in contact with the ground.

SUMMARY OF THE INVENTION

The present invention provides a power wheelchair that normally rests on drive wheels to the rear of its center of gravity and on at least one caster wheel in front of its center of gravity. The wheelchair has at least one anti-tip caster wheel rearward of the drive wheels. The anti-tip caster wheel is movable up and down and is preferably normally positioned in contact with the ground when the wheelchair is resting on level ground. The anti-tip caster wheel is connected to the drive wheels' suspension so that it moves in response to movements of the wheelchair.

Specifically, the anti-tip caster wheel is connected to the wheelchair through a mounting arrangement that causes the anti-tip caster wheel to move upward a small degree when the wheelchair is accelerating in reverse and otherwise remains in contact with the ground during normal forward operation.

In one aspect of the invention, a pair of suspension arms are mounted one on each side of a frame of the wheelchair, each pivoted to the frame about a suspension axis positioned rearward of the drive wheel axis. Each drive wheel and its associated motor are mounted on the suspension arm. At least one anti-tip caster wheel is mounted on the suspension arm and positioned opposite the suspension axis from the drive wheel axis. The anti-tip caster wheel is positioned so as to be in contact with the ground in a normal resting state of the wheelchair. Thus, the anti-tip caster wheel is connected to one of the drive wheels for up-and-down movement responsive to and in an opposite sense from movement of or torque created by the drive wheel.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

DETAILED DESCRIPTION OF THE DRAWINGS

Figure 1:
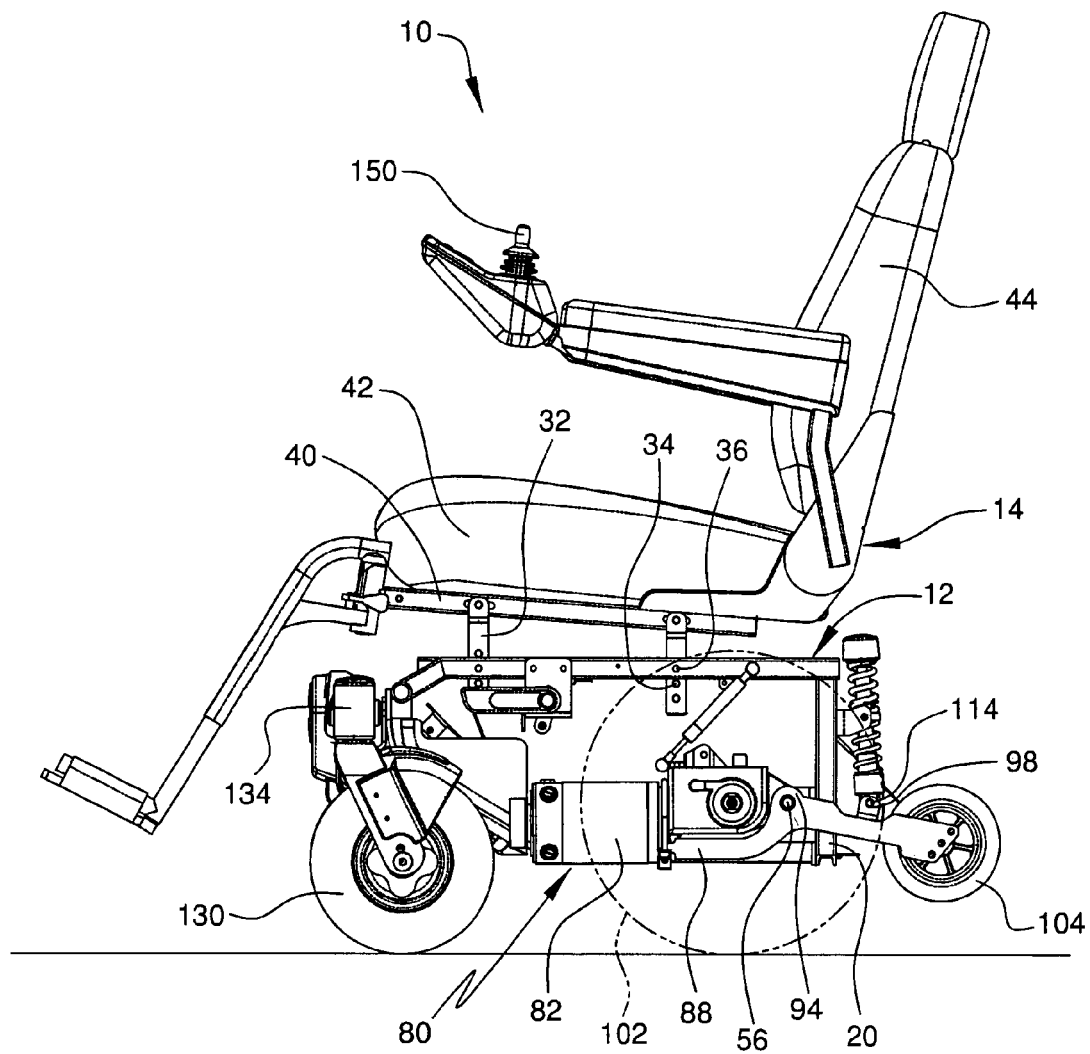
FIG. 1 is a left side view of a power wheelchair of the invention.

Referring to the drawings, where like numerals identify like elements, one form of a power wheelchair is shown and is designated generally by reference numeral 10. The power wheelchair 10 as shown in FIG. 1 includes a body in the form of a frame 12, with a variety of equipment mounted within and around the frame, and a seat 14 supported on top. The wheelchair body is mounted on wheels and suspension mechanisms that will be described in more detail below.

Figure 2:
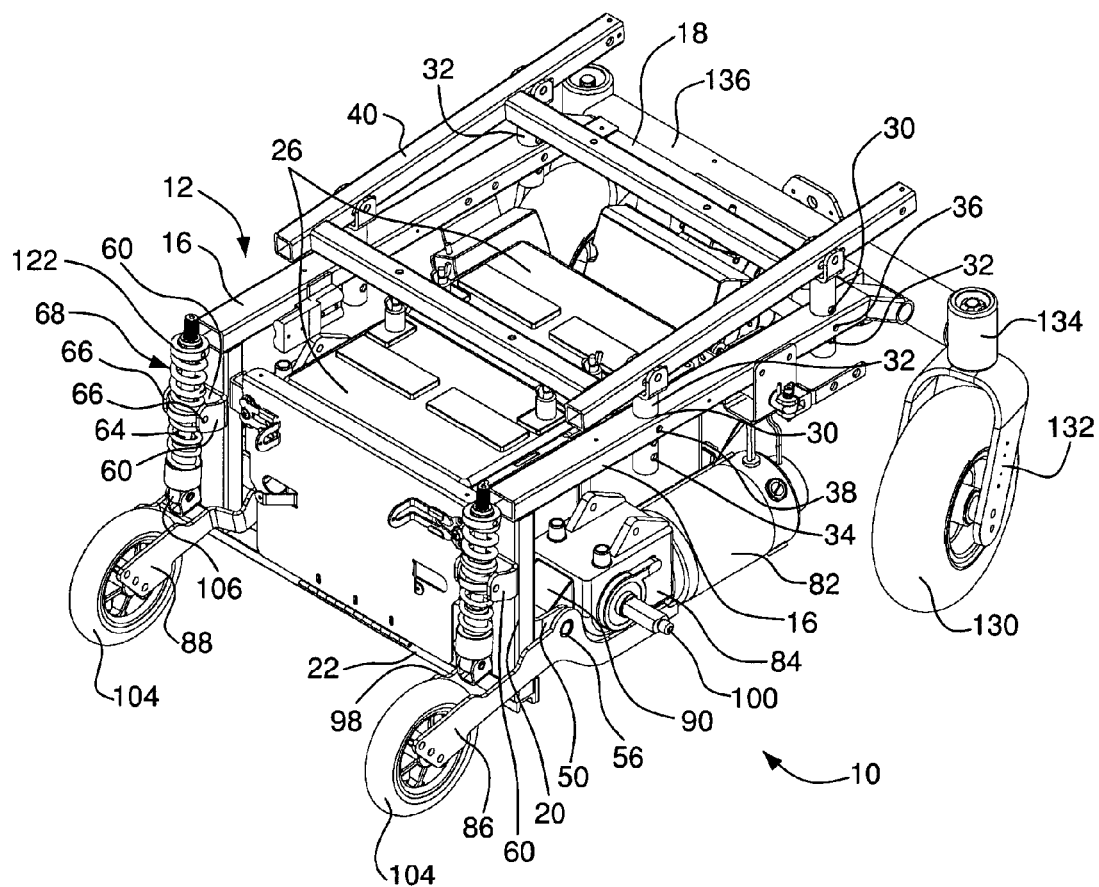
FIG. 2 is an oblique view looking at the right rear of the power wheelchair of FIG. 1.
Figure 3:
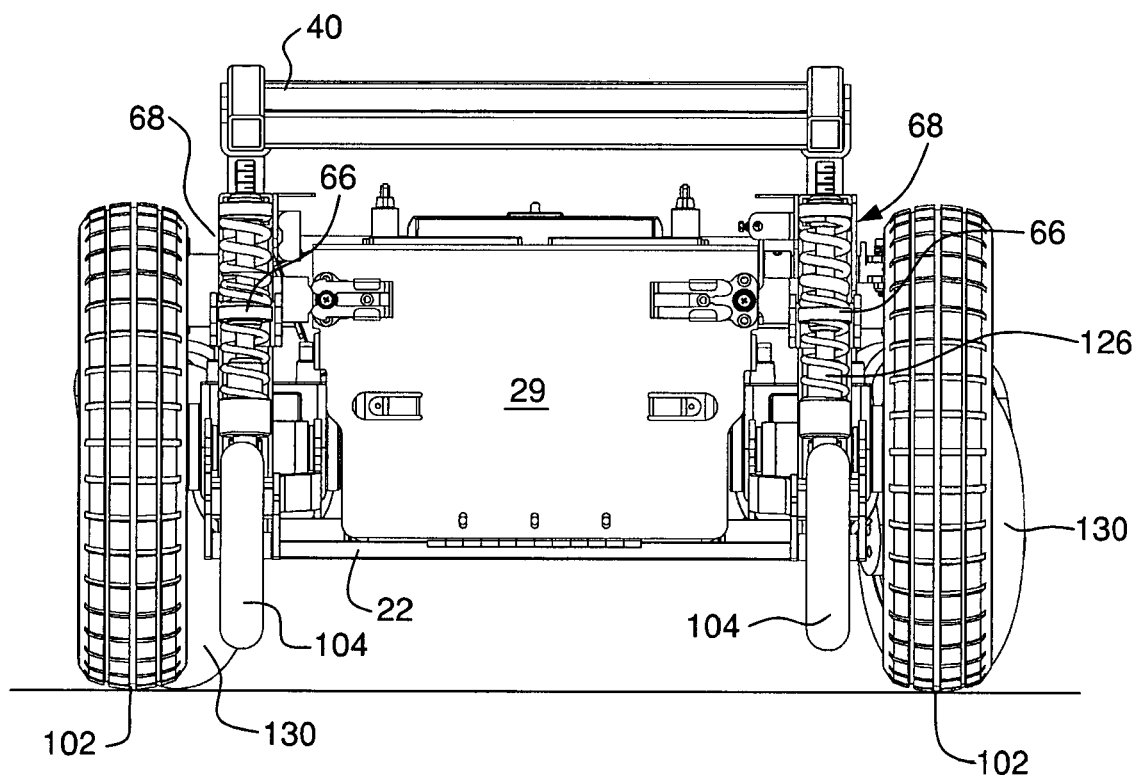
FIG. 3 is a rear view of the power wheelchair of FIG. 1, with the shell and seat removed but with the drive wheels in place.
Figure 4:
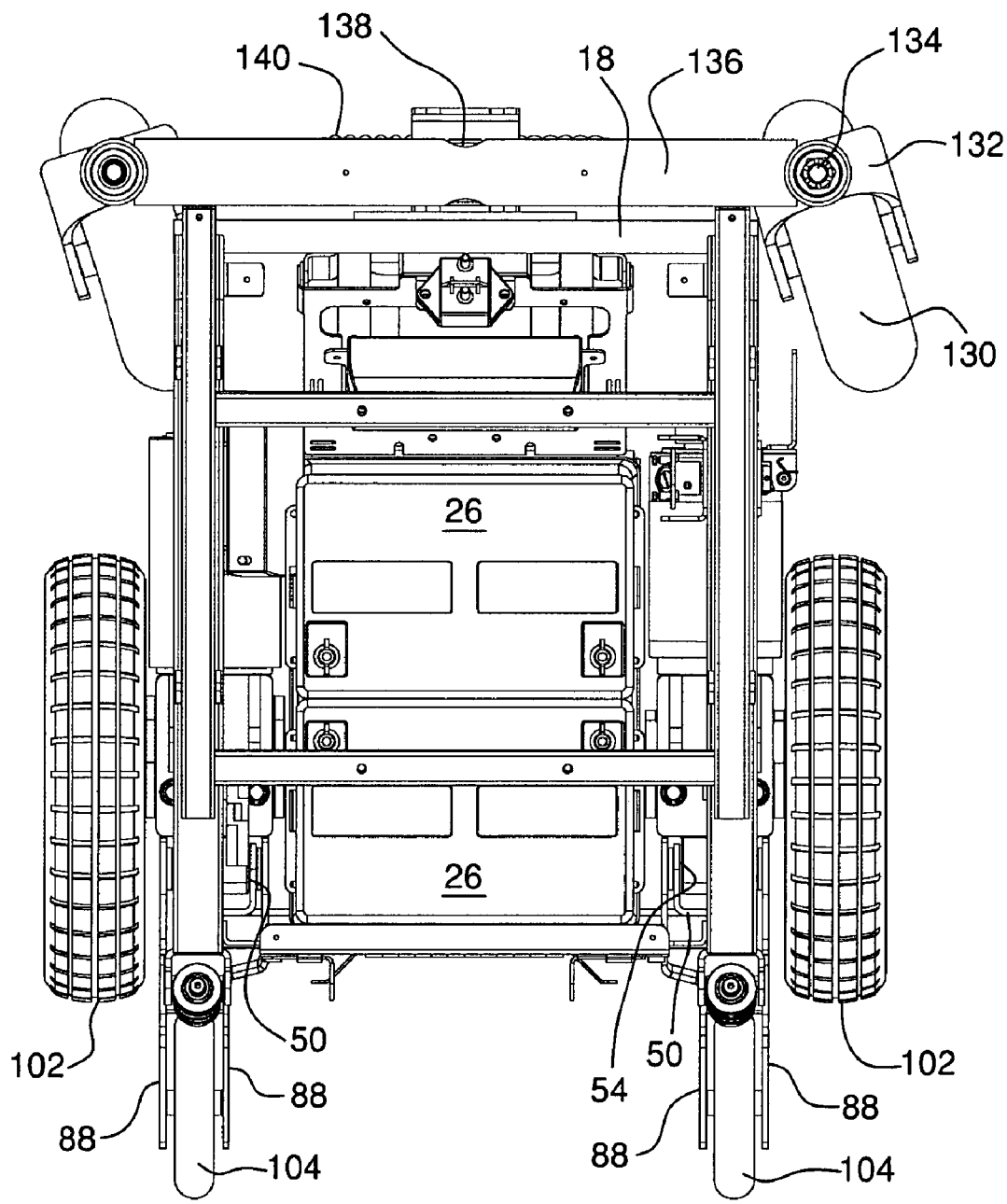
FIG. 4 is a top view of the power wheelchair as seen in FIG. 3.

As shown in FIG. 2, the frame 12 includes left and right longitudinally extending upper members 16 and a front transversely extending upper member 18. The frame 12 is preferably fabricated of hollow tubular rectangular cross-section steel members that are welded together. The frame 12 further includes a pair of rear upright members 20, which are preferably welded to and extend downwardly from the rear ends of the longitudinally extending upper members 16. A transversely extending rear lower cross-member 22 preferably extends between the bottom ends of the downwardly extending members 20.

Figure 5:
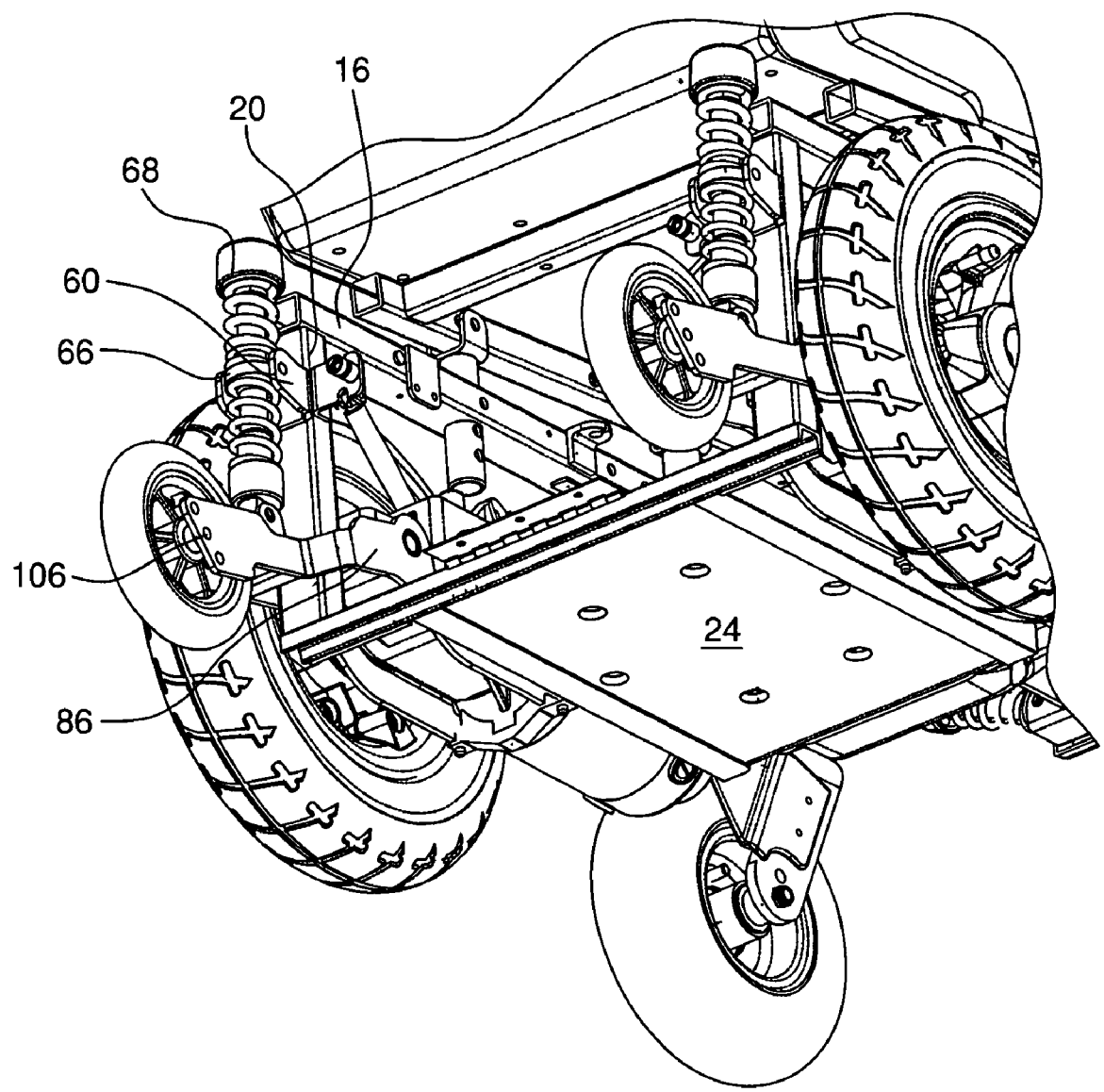
FIG. 5 is an oblique view of the power wheelchair, seen from below, behind, and to one side.

A pan 24 (see FIGS. 5 & 6) for carrying a power supply, for example, one or more batteries 26, is welded to the rear transversely extending lower cross-member 22 and to a forward portion 28 extending from the front cross-member 18. Alternatively, the pan 24 may be removable from the frame 12 and may merely rest or be attached at its forward and rearward edges on lower cross members or the like. The batteries 26 are preferably mounted so as to be easily removable for recharging, replacement, or storage, and are not shown in FIGS. 5 and 6. The batteries 26 are accessible from the rear through a door 29, which is omitted from FIGS. 5 and 6 in the interests of clarity.

The longitudinally extending upper members 16 have apertures 30 formed therein, preferably by drilling or stamping. The apertures 30 receive seat support members 32 providing manual height and tilt adjustment of the seat 14 without use of tools. As shown in FIGS. 1 and 2, each of the support members 32 has several transverse holes 34, spaced apart vertically. The tubular upper members 16 have transverse holes 36 intersecting the apertures 30. A pin 38 is inserted through each of the transverse holes 36 and through a selected transverse hole 34, fixing the corresponding seat support member 32 at a desired height relative to the frame upper member 16. The upper ends of the support members 32 are formed as devises supporting a frame 40 (FIG. 2) for the seat 14 (FIG. 1). The seat 14 preferably includes a cushion 42 that directly supports a seat occupant and a seat back 44.

Figure 6:
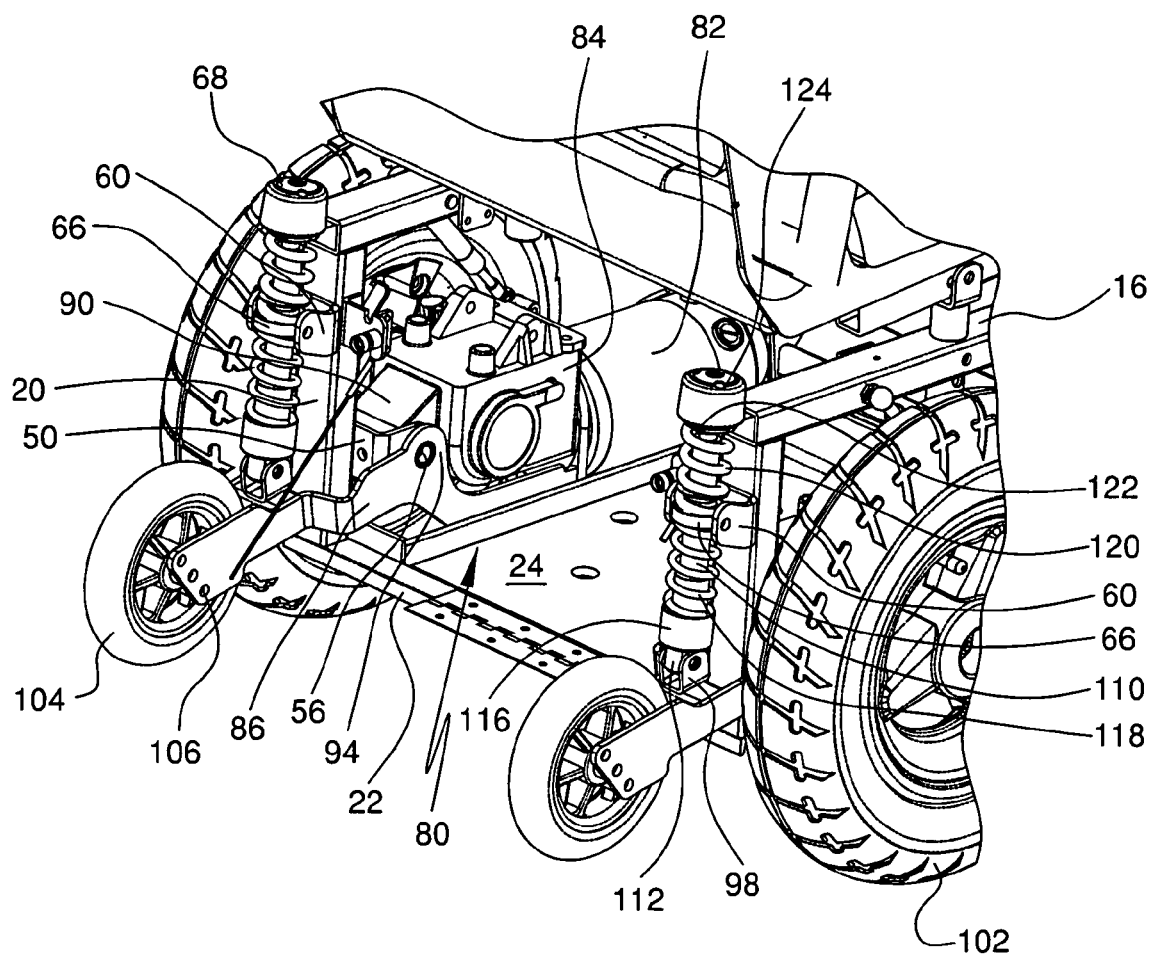
FIG. 6 is an oblique view of the power wheelchair, seen from above, behind, and to one side.

As best seen in FIGS. 2 and 6, the frame 12 further includes a pair of eye portions 50, each of which comprises a pair of parallel plates projecting forwards from a respective upright rear frame member 20. Each of the eye portions 50 is preferably formed from a single piece of metal bent into a U-shaped bracket, with the middle of the U-shape welded to the forwardly facing surface of the frame member 20 and the legs of the U-shape defining the plates. The plates have aligned apertures formed therein which receive a suspension pivot shaft 56.

The frame 12 further includes a pair of rearwardly extending eye portions 60, each of which comprises a pair of parallel plates secured to a respective one of the rear upright frame members 20, preferably by welding. Each of the eye portions 60 is preferably formed from a single piece of metal bent into a U-shaped bracket, with the middle of the U-shape welded to the rearwardly facing surface of the frame member 20 and the legs of the U-shape defining the plates. The plates have aligned apertures formed therein, which receive a pin for mounting a suspension plate 66 that supports a suspension spring-strut assembly 68.

The power wheelchair 10 includes a pair of drive assemblies indicated generally by the reference numeral 80. Each drive assembly 80 includes a motor 82, a transmission 84, and a suspension arm 86. The suspension arm 86 includes a pair of plates 88 disposed on either side of one of the upright frame members 20. The suspension arms 86 are rigidly connected at one end to the motor and transmission combinations 82 and 84. The attachment of the plates 88 may be made to the motors 82 or to the transmissions 84 in any suitable way, for example, by a clamp secured about the motor (not shown).

The transmission 84 includes an ear portion 90 extending therefrom and defining an aperture in which the pivot shaft 56 is journaled. The plates 88 of the suspension arm 86 comprise ears 94 with apertures in which the ends of the pivot shafts 56 are journaled. An eye portion 98 is mounted between the plates 88 of the rearward portion of each suspension arm 86. The base of the spring-strut assembly 68 is pivotally attached to the eye portion 98. Thus, each drive assembly 80 can pivot about the pivot shaft 56 as a single unit, through a limited arc in a vertical, fore-and-aft plane relative to the frame 12 of the wheelchair 10, under the influence of the spring-strut assembly 68, with the suspension arm 86 acting as a rocker arm.

The transmissions 84 are preferably right-angle worm drives serving to change the axis about which driving rotation is provided by the motors 82. The output from each transmission is a stub axle 100 projecting outwards from the drive assembly 80, and carrying one of a pair of drive wheels 102 (shown in phantom in FIG. 1 and also shown in FIGS. 3 to 6). The drive wheels 102 are thus connected to the frame 12 so as to be rotatable about transverse axes defined by the stub axles 100, and so as to be movable up and down about the pivot shaft 56. Hence, each drive wheel 102 is free to move relative to the frame 12 independently of the remaining drive wheel 102 upon encountering an obstacle.

The axes of rotation of the wheels 102, as illustrated, are under a rear portion of a seat cushion 42 of the seat 14. The drive motors 82 are reversible, and each motor drives the associated drive wheel 102 independently. As a result, the wheelchair 10 can be made to pivot or turn, thus enabling the wheelchair to effectively spin about a vertical axis. This is accomplished by the motors 82 rotating the drive wheels 102 in opposite directions.

Each suspension arm 86 carries at its outer end a rear anti-tip wheel 104, mounted between the two plates 88. The rear anti-tip wheels 104 do not normally contact the ground on which the wheelchair 10 operates. Instead, the anti-tip wheels 104 are maintained above the ground and provide protection against tipping in the event of rearward pitching of the wheelchair 10, such as might result from a forward encounter with an obstacle, ascending a significant upgrade, sudden acceleration or the like. As is best seen in FIG. 6, each plate 88 is provided with a row of holes 106, and each anti-tip wheel 104 is mounted in a pair of the holes 106 in the two plates 88. The resting position of the anti-tip wheels can, thus, be adjusted within a limited range by selecting the pair of holes 106 to which the anti-tip wheel is mounted.

Each spring assembly 68 comprises a central shaft 110, attached at its lower end to an ear 112, which is pivoted to the eye portion 98 on the anti-tip arm 86 by a pivot pin 114. Around the lower end of the central shaft 110 is a collar 116, which acts as a lower abutment for a lower coil spring 118 that surrounds the shaft 110. The upper end of the lower coil spring 118 abuts the suspension plate 66, which is journaled in the eye portion 60 on the upright frame member 20. The suspension plate 66 surrounds the central shaft 110, but the shaft is free to slide up and down through a hole in the middle of the suspension plate. Above the suspension plate 66, the central shaft 110 is surrounded by an upper coil spring 120, the lower end of which abuts the suspension plate and the upper end of which abuts a collar 122 retained on the top of the central shaft by a cap nut 124. The upper and lower coil springs 120 and 118 are normally in compression. Thus, the lower coil spring 118 presses upwards and the upper coil spring 120 presses downwards on the suspension plate 66 and, through the eye portion 60, on the frame 12. The lower coil spring 118 also presses downwards on the collar 116, and thus on the anti-tip arm 86. The upper coil spring, in turn, also presses upwards on the collar 122, imposing an upward force on the central shaft 110 and thereby on the anti-tip arm 86.

In the resting position of the wheelchair 10, most of the weight of the wheelchair and user is transmitted from the frame 12 to the suspension assemblies 80 by the pivot shafts 56, and is borne by the drive wheels 102. A substantial turning moment arises as a result of the horizontal separation between the drive wheel axles 100 and the pivot shafts 56. The anti-tip wheels 104 are not in contact with the ground, and so do not counter this turning moment. The necessary counter-moment is provided by the upper coil springs 120.

The upper coil springs 120 also provide the primary spring suspension for the wheelchair 10. The lower coil springs 118, which act in opposition to the upper coil springs 120, serve primarily to steady the suspension assemblies 80 if the anti-tip wheels 104 should move upward far enough, or suddenly enough, that the upper coil springs are no longer in compression. As may be seen in FIG. 6, the upper coil springs 120 are considerably heavier than the lower coil springs 116. The stiffness and resting height of the suspension may be adjustable by means of the cap nuts 124. The lower part of each central shaft 110 may comprise a damper unit 126.

The wheelchair 10 further includes a pair of idler wheels 130, which are the front ground-engaging wheels of the wheelchair. The drive wheels 102 are the rear ground-engaging wheels of the wheelchair 10. The front ground-engaging wheels 130 are caster-type idler wheels. As is well known for caster wheels, the wheels 130 are rotatably mounted in forks or yokes 132 for rotation about horizontal axes. The forks 132 are pivotally mounted in bearings 134 for swiveling about generally vertical axes. The swivel axes of the forks are on the centerlines of the wheels, but are offset from the axes of rotation of the wheels. Thus, as the wheelchair moves, the caster wheels 130 naturally align themselves to trail behind their respective swivel bearings 134.

The bearings 134 are mounted on the ends of a crossbar 136, which is pivoted at its center to the upper front cross-member 18 of the frame 12 of the wheelchair 10, by a bearing 138 with a rocking axis that is aligned fore-and-aft. Coil springs 140 act in compression between the crossbar 136 and the frame 12 to bias the crossbar 136 into a central position, horizontal when the wheelchair 10 is upright. It will be appreciated that, when the crossbar 136 tilts, the swivel axes of the bearings 134 depart from the vertical. However, the departure is not sufficient to interfere with the castering action of the idler wheels 130, especially as it only occurs when the wheelchair 10 is passing over uneven ground.

The curb-climbing power wheelchair 10, as illustrated in the drawings, has the drive wheels 102 positioned towards the longitudinal center of the wheelchair. This is possible because the rear anti-tip wheels 104, by rising and lowering in response to the motion of the wheelchair, provide protection against overbalancing without unduly hindering the ability of the wheelchair to descend curbs and the like. This allows the drive wheels 102 to be placed close to the center of gravity of the wheelchair and occupant. This configuration concentrates, and effectively maximizes, the weight on the drive wheels 102. This provides several benefits. Overall traction is increased. With increased traction, better obstacle-climbing ability results, increasing overall capability and usability of the wheelchair. Additionally, with increased traction, deceleration is more positive and more predictable.

With increased traction also comes superior straight-line stability. Having the center of mass close to the axis of the drive wheels reduces the "pendulum effect" present in many prior art power wheelchairs.

Increased traction results in extremely accurate response of the curb-climbing power wheelchair to inputs provided by the wheelchair user through a joystick control. This translates into more predictable and positive handling and a much easier learning curve for the curb-climbing power wheelchair user when the user is first becoming accustomed to the wheelchair.

Yet another benefit of the geometry of the power wheelchair is an extremely tight turning radius. The independent rotation of the drive wheels in opposite directions enables the wheelchair to rotate about any point on the common axis of the drive wheels. This, combined with the central location of that axis, allows the user of the curb-climbing power wheelchair to gain access to, and to turn around in, confined areas such as those encountered in hallways, bathrooms, small kitchens, and office areas.

Pivotally mounting the crossbar 136 to the frame 12 provides a smoother ride when the wheelchair 10 encounters a bump. As one of the idler wheels 130 rides over the bump, the crossbar 136 rotates about the pivotal connection 138, and the other idler wheel is lowered relative to the frame 12 of the wheelchair 10. The result is that the wheelchair 10 remains largely level from side to side, resting on the drive wheels 102, and the front of the wheelchair is raised by about half the height of the obstacle. The interaction of the springs 120 and 140 will result in a slight tilting of the wheelchair, which provides biokinetic feedback to the user without reducing stability. If one of the idler wheels 130 passes through a dip, the suspension will adjust similarly, with the front of the wheelchair 10 dipping by about half the effective depth of the dip, and the wheelchair rolling slightly to the side on which the dip is.

When a drive wheel 102 encounters an obstacle and moves upwardly, the suspension assembly 80 pivots in a clockwise direction as seen in FIG. 1 about the pivot shaft 56. This pivotal movement of the suspension assembly 80 allows the drive wheel 102 to rise, and causes the associated anti-tip wheel 104 to descend. The movement compresses the upper coil spring 120, and allows the lower coil spring 118 to expand. This change in the length of the springs produces a restoring force that urges the suspension assembly 80 to rotate in the opposite direction about the pivot pin 56, returning the drive wheel 102 to its original position.

When the user commands forward acceleration of the wheelchair 10, each drive motor/transmission combination exerts a torque on its associated drive wheel 102 in a counter-clockwise direction as seen in FIG. 1. The reaction torque at the transmission 84 attempts to rotate the suspension assembly 80 about the pivot pin 56 in a clockwise direction as seen in FIG. 1, which tends to lower the rear anti-tip wheels 104 towards the ground. The inertia of the user of the wheelchair 10, whose center of mass is above the principal suspension axes 100 and 56, tends to result in a downward force on the pivot shaft 56, which also causes the suspension assembly 80 to rotate in the same direction. This force is even more pronounced on an upward incline due to more resistance to forward movement, i.e., greater torque effect.

As the load on the wheelchair increase it requires more torque which, in turn, causes the anti-tip wheels to move closer to the ground. Thus, in situations where there is high loading (and more of a chance for instability) the anti-tip wheels are closer to the ground. Accordingly, the system self-compensates to adjust for changes in operation.

Another example of the self compensating aspect of the invention is in situations where the wheelchair is facing uphill and is decelerating backwards, then tries to move forwards. This motion produces a greater torque which, in turn, lowers the anti-tip wheels closer to the ground. Hence, as the torque increases (which typically means a greater need for stability), the system accommodates the need by moving the anti-tip wheels closer to the ground.

When the wheelchair 10 descends from a curb or other elevated area to a lower position, the user naturally tends to reduce the speed of the wheelchair. The braking of the drive wheels 102 results in a reaction torque at the transmission 84 that tends to cause the suspension assembly 80 to rotate counter-clockwise as seen in FIG. 1, raising the anti-tip wheels 104 further from the ground, so that they do not catch on the curb. When descending a high curb, the rear anti-tip wheels 104 may contact the top of the curb as the drive wheels 102 descend. If this happens, the suspension assemblies 80 will rotate counter-clockwise as seen in FIG. 1. The lower parts of the springs 68 will compress, absorbing some of the upward force caused by the contact with the curb. The counter-clockwise rotation of the suspension assemblies will cause the drive wheels to move downward. The result of this is that the drive wheels 102 will contact the ground below the curb sooner, and more gently, than would be the case with fixed anti-tip wheels. The downward force, in addition to maintaining the drive wheels in contact with the ground, also increases the traction of the drive wheels since they are urged into contact with the ground. The energy stored in the springs 68 is released as the rear anti-tip wheels 104 roll off the curb.

The wheelchair 10 further preferably includes an outer shell that both provides a decorative, aesthetically pleasing appearance for the wheelchair and protects the wheelchair user from contact with the batteries 26 and with the electrical connections between the batteries 26 and the motors 82. The shell further provides protection for the batteries 26, and to some extent for the motors 82 and the transmissions 84. Such shells are well known. A shell similar to that shown is "body 34" in commonly assigned U.S. Pat. No. 5,944,131 may be suitable. In the interests of clarity, the wheelchair 10 has been shown in the drawings without the shell.

An adjustable footrest is preferably provided at the front of the wheelchair 10. Such footrests are well known and, in the interests of clarity, the footrest has not been shown in the drawings, except in FIG. 1.

Power wheelchair control is effectuated utilizing a joystick controller 150. Suitable joystick controllers are available from Penny & Giles in Christchurch, England, and are programmable and adjustable to provide variable sensitivity for the user.

Figure 7:
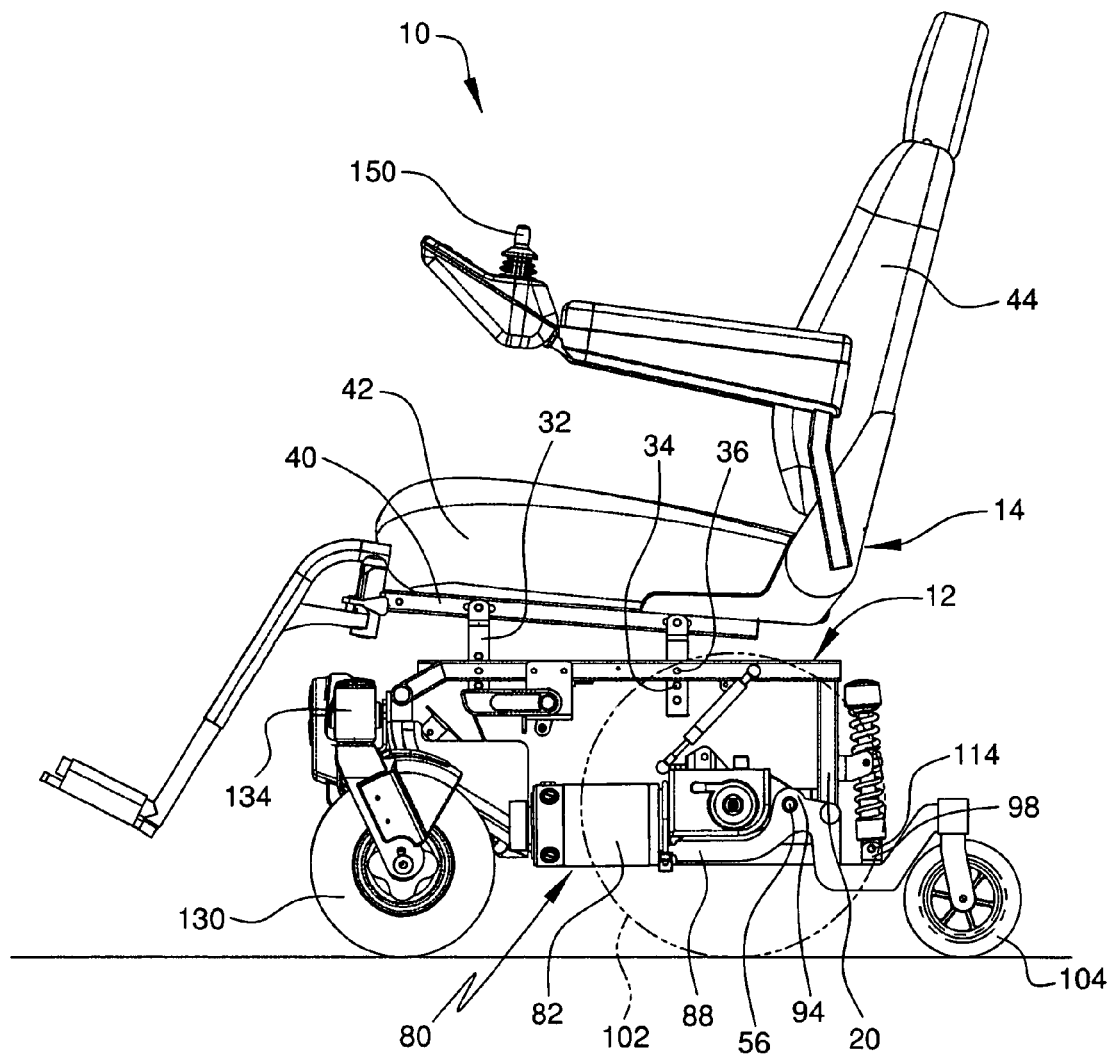
FIG. 7 is an alternate embodiment of the present invention wherein the anti-tip caster wheel is positioned in contact with the ground.

Referring now to FIG. 7, an alternate embodiment of the invention is disclosed. In this embodiment, the anti-tip wheel is a caster wheel that is maintained in direct contact with the ground during normal operation of the wheelchair. The mounting arrangement described above is used to control the upward motion of the wheel. More particularly, as described above, the anti-tip caster wheels are configured to pivot in the opposite direction of the torquing of the drive wheels. As such, as the wheelchair accelerates forward, the mounting arrangement causes the anti-tip caster wheels to be driven harder into the ground, thus increasing the stability and traction of the wheelchair. When the wheelchair accelerates in reverse, it is important that the anti-tip caster wheels not be in direct contact with the ground. In this embodiment of the invention, the mounting arrangement lifts the anti-tip caster wheels off the ground slightly.

The present invention may be embodied in other specific forms without departing from the spirit or essential attributes and, accordingly, reference should be made to the appended claims, rather than to the foregoing specification, as indicating the scope of the invention.

What is claimed is:

1. A power wheelchair comprising:
   a frame;
   a pair of drive wheels, each wheel having an axis of rotation;
   motors for driving respective drive wheels;
   a pair of suspension arms, one on each side of the frame, each arm pivoted to the frame about a suspension axis rearward of the axes of rotation of the drive wheels, each of the drive wheels and its associated motor being mounted on a respective one of the suspension arms;
   at least one ground-engaging idler wheel connected to said frame in front of said drive wheels; and
   at least one anti-tip wheel mounted to one of said suspension arms, rearward of the respective drive wheel, the at least one anti-tip wheel being in contact with the ground in a normal operational state of the wheelchair and connected to one of the drive wheels, the connection between the anti-tip wheel and the drive wheel about the suspension axis causing said anti-tip wheel to move relative to said frame in response to and in an opposite direction from movement of said one drive wheel relative to said frame as a result of the torque created by the motor in rotating the drive wheel.

2. The power wheelchair of claim 1, further comprising a second anti-tip wheel, said anti-tip wheels being connected to respective ones of said drive wheels.

3. The power wheelchair of claim 1, wherein said at least one anti-tip wheel is mounted on a respective one of the suspension arms rearward of said suspension axis.

4. The power wheelchair of claim 1, further comprising a resilient suspension between each said suspension arm and said frame.

5. The power wheelchair of claim 1, wherein each said suspension arm is independently attached to said frame.

6. The power wheelchair of claim 1, wherein said frame includes an upper covering shell.

7. The power wheelchair of claim 6, wherein the frame supports a seat.

8. A power wheelchair comprising:
   a frame;
   a pair of drive wheels rotatable about transverse axes and positioned on opposite sides of the frame;
   a pair of drive motors, each motor operatively coupled to a respective drive wheel;
   a pair of suspension arms, each suspension arm pivotally connected to said frame, the motors and respective drive wheels attached to a respective suspension arm forward of the pivotal connection of the suspension arm to the frame;
   at least one idler wheel attached to the frame forward of the drive wheels, the idler wheel normally contacting the ground along with the drive wheels; and
   a pair of anti-tip wheels respectively mounted to the suspension arm on each side of the frame, each anti-tip wheel normally in contact with the ground and positioned rearward of the corresponding drive wheels and rearward of the pivotal mounting of the suspension arm, the anti-tip wheels being operatively coupled to said motors by said suspension arms and responsive to the torque created by the motors and applied to the drive wheels for relative up-and-down motion in opposite directions from the torque of said motors.

9. The power wheelchair of claim 8, wherein each drive wheel is independently attached to said frame.

10. The power wheelchair of claim 8, wherein said frame includes an upper covering shell.

11. The power wheelchair of claim 10, wherein said frame supports a seat.

12. The power wheelchair of claim 8, further comprising means for adjusting the distance between said anti-tip wheels and the ground.

13. A power wheelchair comprising:
a frame;
a pair of ground contacting drive wheels disposed on opposite sides of the frame;
a pair of motors, each motor independently driving a respective drive wheel;
a pair of suspension arms, one on each side of the frame, each suspension arm pivotally attached to the frame, each of the drive wheels and its associated motor being mounted on a respective one of the suspension arms;
a pair of springs, each acting in compression between the frame and a respective one of the suspension arms so as to urge the drive wheel downward relative to the frame;
at least one ground contacting idler wheel disposed at the front of the frame, forward of the drive wheels; and
at least one anti-tip idler wheel mounted to one of the suspension arms opposite of the respective motor and rearward of the frame, the at least one anti-tip idler wheel being mounted so as to normally be in contact with the ground when the wheelchair is resting on level ground on the drive wheels and the at least one front idler wheel, said at least one anti-tip idler wheel being mounted such that reverse torque of the motors on the drive wheels urges the anti-tip idler wheel in an upward direction and out of contact with the ground.

14. A power wheelchair according to claim 13, wherein there are two anti-tip idler wheels, one of the anti-tip idler wheel mounted on either side of said frame, wherein the suspension arms are independently mounted, and wherein each said anti-tip idler wheel is connected to an associated suspension arm.

15. A power wheelchair according to claim 13, wherein the drive wheels are mounted with their axes of rotation fixed relative to the suspension arms and located forward of the pivot point of the suspension arms.

16. A power wheelchair according to claim 13, wherein the motors are mounted on the suspension arms forward of the drive wheels.

17. A power wheelchair according to claim 13, wherein there are two anti-tip wheels, and wherein said suspension arms include a pair of pivotally-mounted rocker arms, with a respective drive wheel and anti-tip wheel mounted on each rocker arm, the rocker arm being pivotally mounted at a point between the drive wheel and the anti-tip wheel.

18. A power wheelchair according to claim 17, wherein one spring attaches to each rocker arm between the drive wheel and the anti-tip wheel.

19. A power wheelchair according to claim 13, further comprising a second pair of springs urging the anti-tip idler wheels downwards relative to the frame.

20. A power wheelchair according to claim 13, wherein said frame includes an upper covering shell.

21. A power wheelchair according to claim 13, further comprising two said front idler wheels, one at each side of the frame.

22. A power wheelchair according to claim 21, further comprising a crossbar that extends across the front of the frame, the crossbar being pivotally mounted to the frame about a central fore-and-aft axis, the crossbar carrying a front idler wheel at each end.

23. A power wheelchair comprising:
a frame;
a pair of drive wheels, each wheel having an axis of rotation;
motors for driving respective drive wheels;
a pair of suspension arms, one on each side of the frame, each arm pivoted to the frame about a suspension axis rearward of the axes of rotation of the drive wheels, each of the drive wheels and its associated motor being mounted on a respective one of the suspension arms;
at least one ground-engaging idler wheel connected to said frame in front of said drive wheels;
at least one anti-tip wheel mounted to the wheelchair so as to be in contact with the ground in a normal resting state of the wheelchair and connected to one of the drive wheels, the connection between the anti-tip wheel and the drive wheel permitting the axis of rotation of said anti-tip wheel to move relative to said frame in response to and in an opposite direction from movement of the axis of rotation of said one drive wheel relative to said frame; and
a resilient suspension between each said suspension arm and said frame, wherein each said resilient suspension further comprises combination spring-strut beams for governing arcuate upward movement of said anti-tip wheels relative to said frame.

24. A power wheelchair comprising:
a frame;
a pair of drive wheels rotatable about transverse axes;
motors pivotally connected to said frame, the motors for driving respective drive wheels;
at least one idler wheel attached to the frame so as to be positioned forward of the drive wheels;
anti-tip wheels mounted to the wheelchair so as to be in contact with the ground and rearward of said drive wheels, the anti-tip wheels being fixedly connected to said motors for up-and-down motion relative to said frame in opposite directions from said motors as a result of the torque created by the motors in rotating the drive wheels; and
combination spring-strut beams for governing arcuate upward movement of said anti-tip wheels relative to said frame.

* * * * *

UNITED STATES PATENT AND TRADEMARK OFFICE
CERTIFICATE OF CORRECTION

| | | |
|---|---|---|
| PATENT NO. | : 7,219,924 B2 | Page 1 of 1 |
| APPLICATION NO. | : 10/613669 | |
| DATED | : May 22, 2007 | |
| INVENTOR(S) | : Mulhern et al. | |

It is certified that error appears in the above-identified patent and that said Letters Patent is hereby corrected as shown below:

<u>In Column 3</u>
At line 23, change "devises" to --clevises--.

Signed and Sealed this

Fourteenth Day of August, 2007

JON W. DUDAS
*Director of the United States Patent and Trademark Office*